INVENTORS
GERALD H. SHAFF
MELVIN J. STRAUB
RAYMON H. DAMMAR

Moore, White & Burd
ATTORNEYS

INVENTORS
GERALD H. SHAFF
MELVIN J. STRAUB
RAYMON H. DAMMAR

Moore, White & Burd
ATTORNEYS

Aug. 29, 1967  G. H. SHAFF ETAL  3,338,526
STATOR WINDER

Filed July 27, 1964  8 Sheets-Sheet 3

INVENTORS
GERALD H. SHAFF
MELVIN J. STRAUB
RAYMON H. DAMMAR

Moore, White & Bund
ATTORNEYS

INVENTORS
GERALD H. SHAFF
MELVIN J. STRAUB
RAYMON H. DAMMAR
Moore, White & Bund
ATTORNEYS

INVENTORS
GERALD H. SHAFF
MELVIN J. STRAUB
RAYMON H. DAMMAR

Moore, White & Burd
ATTORNEYS

Aug. 29, 1967  G. H. SHAFF ETAL  3,338,526
STATOR WINDER

Filed July 27, 1964  8 Sheets-Sheet 3

INVENTORS
GERALD H. SHAFF
MELVIN J. STRAUB
RAYMON H. DAMMAR
Moore, White & Burd
ATTORNEYS United States Patent Office 3,338,526
Patented Aug. 29, 1967

3,338,526
STATOR WINDER
Gerald H. Shaff and Raymon H. Dammar, Minneapolis, and Melvin J. Straub, Hopkins, Minn., assignors to Possis Machine Corporation, Minneapolis, Minn., a corporation of Minnesota
Filed July 27, 1964, Ser. No. 385,162
17 Claims. (Cl. 242—1.1)

This invention relates to the winding of wires onto stator cores for rotating electrical machinery. It is novel in having the principal shroud member supported against displacement in one plane or direction by reason of engaging a portion of the structure which supports the wire winding needle or gun and is supported in another direction by engaging the core being wound. It is further novel in providing a split C-ring for plugging the wire entry slots of the stator and supporting the shroud against displacement in place of the core during the indexing portions of a winding cycle. This invention also provides novel shroud structure for spacing the ends of the coils wound from the cuffs sometimes used to insulate the slots in a stator core. This invention also contemplates a method of winding in which the wire winding and shroud mechanism or tooling may remain stationary and the stator core is moved away from it for indexing and removal. This invention also provides flanking tooling for the main shroud which flanking tooling is cut back to avoid engaging previously wound coils in the later stages of winding the core. Portions of the front of the main shroud extend far less toward the work piece in the machine for the same purpose, namely to avoid engaging previously wound coils. The use of the flanking tooling also assures placing the wires in the desired slots of the work piece. A very simple means of variously positioning the work piece relative to the winding mechanism to provide for multiple layers of windings is also a feature of this machine.

Gun-type stator winding machines are well known in the art, conventionally comprising a winding head having a wire dispensing needle or gun on its outer surface, the head being reciprocally moved through the bore of the stator to be wound and also having limited rotational movement imparted thereto adjacent the ends of its stroke. Movement of the head with its wire dispensing needle through the stator bore in one direction thus carries a wire therethrough to form one side of the coil with the rotational movement of the head at the end of this stroke forming one end turn; the next axial motion of the head in the opposite direction back through the bore forms the other side of the coil and finally the next rotational movement of the head restoring the wire dispensing needle to its original position forms the other end turn thus completing one turn of the coil being wound. Numerous arrangements, such as various hooks and "shroud" members, have been employed in gun-type winding machines in order properly to form the end turns. The end turn-forming members or "shrouds" commonly employed in such machines have conventionally comprised a pair of parts respectively arranged abutting the ends of the stator core member being wound and extending axially outwardly therefrom, each such end turn-forming part having a width corresponding to the pitch of the coil being wound. Thus, with such prior gun-type stator winding machines and end turn-forming shrouds known to the present applicants, the wire dispensing needle on the winding head moved outwardly from the bore of the stator core member carrying the wire over a side of the respective shroud member part with rotation of the winding head at the end of its stroke thus causing the wire to form a loop around the respective shroud member part; subsequent axial movement of the winding head and the wire dispensing needle back through the stator bore thus pulled the wire loop along the outer surface of the respective shroud member part so that it ultimately formed an end turn at the respective end of the stator member. The path of the winding head is thus sequentially parallel and transverse to the axis of the stator bore.

This invention operates in general as described for prior art devices in the foregoing paragraph and is novel in the structure for positioning the shrouding and work piece as set out in the first paragraph hereof.

The object of this invention is to provide a novel coil winding machine.

As a further object of this invention to provide a stator coil winding machine in which the shroud mechanism is stabilized in one plane by engaging structure that is a part of the wire gun supporting mechanism.

Another object of this invention is to provide a stator coil winding machine for stators requiring multiple coils in which means are provided to prevent wires wound in slots from escaping during the indexing procedure.

Still another object of this invention is to provide a stator winding machine which winds coils of wires directly in stators in the slots of which are insulated with cuffs without injuring the cuffs.

A further object of this invention is to provide a method of stator coil winding in which the shrouding or tooling remains stationary and the work piece is applied to it.

Yet another object of this invention is to provide a stator winder capable of winding multiple layers of windings without risk of injury to earlier wound coils while winding the later ones.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 13 is a fragmentary view in a vertical section of the lower end of the shafts and frame shown in FIGURES 1, 2, and 3.

Figure 2:
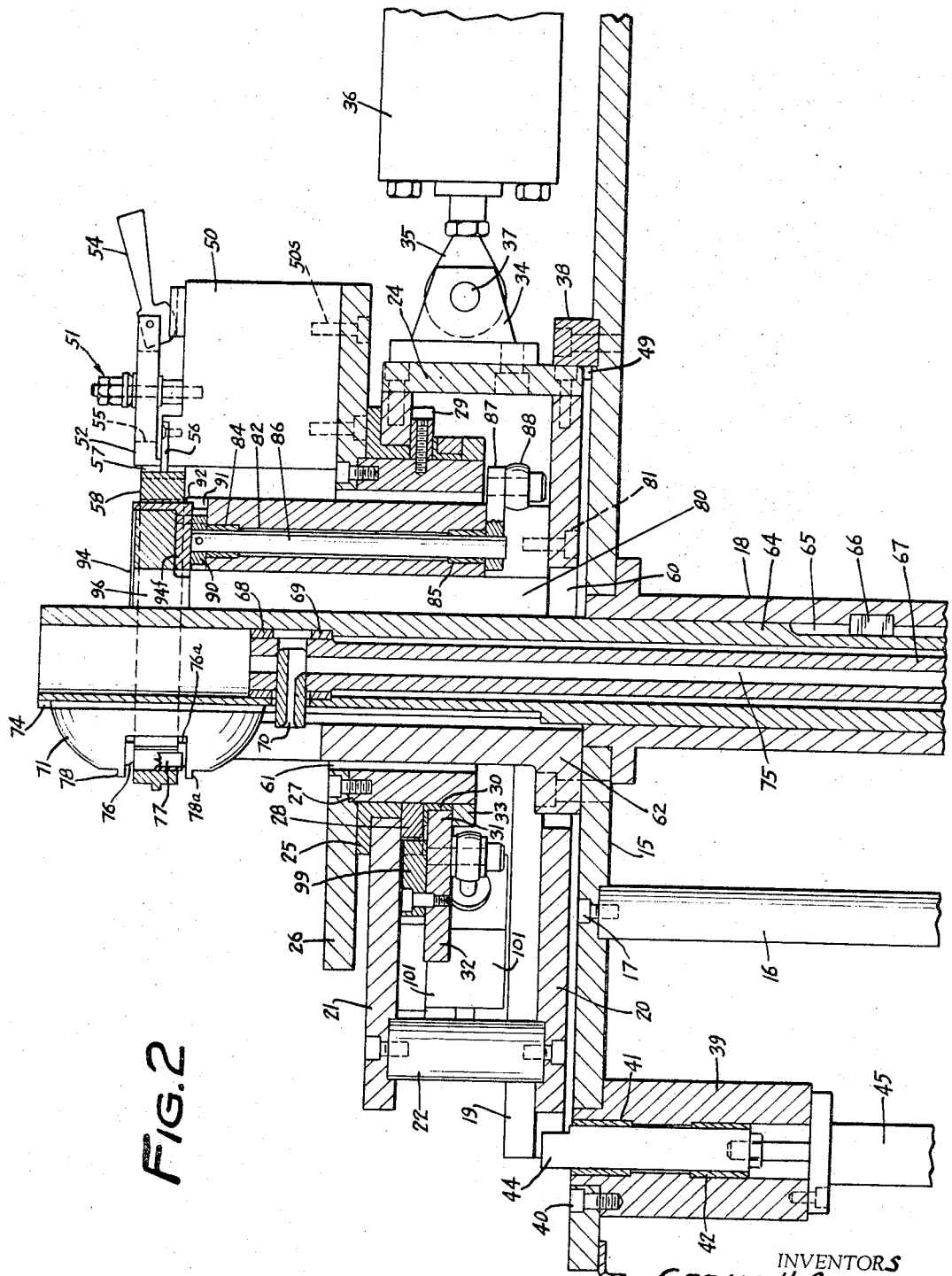
FIGURE 2 is a vertical section of the machine taken on the line and the direction and the arrows 2—2 of FIGURE 1; broken lines illustrate hidden parts.

Referring to the drawings and first to FIGURE 2, the machine may be seen to have a suitable frame or bed 15 supported conventionally by suitable pillars such as the one 16 as well as a central pillar 18 which incorporates within its hollow center some of the wire winding mechanism. Ways, as shown at 19, are rigidly secured to bed 15 and slidably support thereon the bottom member 20 of a table assembly, a top or table portion of which is identified by 21. Top and bottom 21 and 20 respectively are spaced and held rigidly in relation to each other by suitable means such as pillar 22 which is countersunk in each of the top and bottom as shown in FIGURE 2 and screwed thereto conventionally. At the rear end of the table assembly a plate member 24 rigidly secures the two together. In the center of the table assembly is a circular hole in which a suitable shoulder bushing 25 is inserted and this rotatably supports platform 26. A ring member 27 is screwed to platform 26, as shown in FIGURE 2, and extends down through the bushing. Table top 21 is engaged on the underside by a notched ring 28 which is secured to ring 27 suitably as by set screw 29. Another shoulder bushing 30 separates the notched ring 28 from a ring member 31 which embraces the bushing 30 and has a tang 32 extending at the left as viewed in FIGURE 2 for a purpose that will be described in more detail below. At the bottom of ring 27 is a securing ring 33 which holds ring 31 up against the shoulder of bushing 30.

A suitable clevis member 34 is secured conventionally to plate 24 and the end 35 of a suitable linear motion motor such as air cylinder 36 by pin 37. The air cylinder is double acting, and air directed to the forward end of cylinder 36 pulls the table assembly to the position shown in FIGURE 2 and against stop 38 that is screwed to bed 15. Stop 38 limits movement of the table assembly in a right-hand direction as shown in FIGURE 2. At the opposite end of bed 15, as viewed in FIGURE 2, is a vertically bored member 39 which is rigidly secured to bed 15 in a suitable way with the screws 40. A pair of bushings 41 and 42 support the stop-member 44 within the bored member 39 for vertical sliding movement. A suitable linear motion means such as the air cylinder 45 either advances stop member 44 to the position shown in FIGURE 2 or withdraws it below the upper level of bed 15. In the upper position as shown in FIGURE 2, stop 44 limits the movement of bed 15 to the left as viewed in FIGURE 2 which is the amount of movement necessary for indexing. When stop member 44 is withdrawn, air cylinder 36 may advance the table assembly 20–21 substantially farther in order to produce the necessary relative movement between the stator and the winding mechanism to permit removal of the stator therefrom. The important thing here is that it is possible to produce relative movement between the stator core and the winding structure to free the stator from the winding structure for indexing and removal or insertion as desired. The structure showing herein is an illustrative way of producing this desired movement which may be used when the means for positioning the shrouding here shown is used, i.e. moving the stator to the shrouding rather than the reverse.

Figure 1:
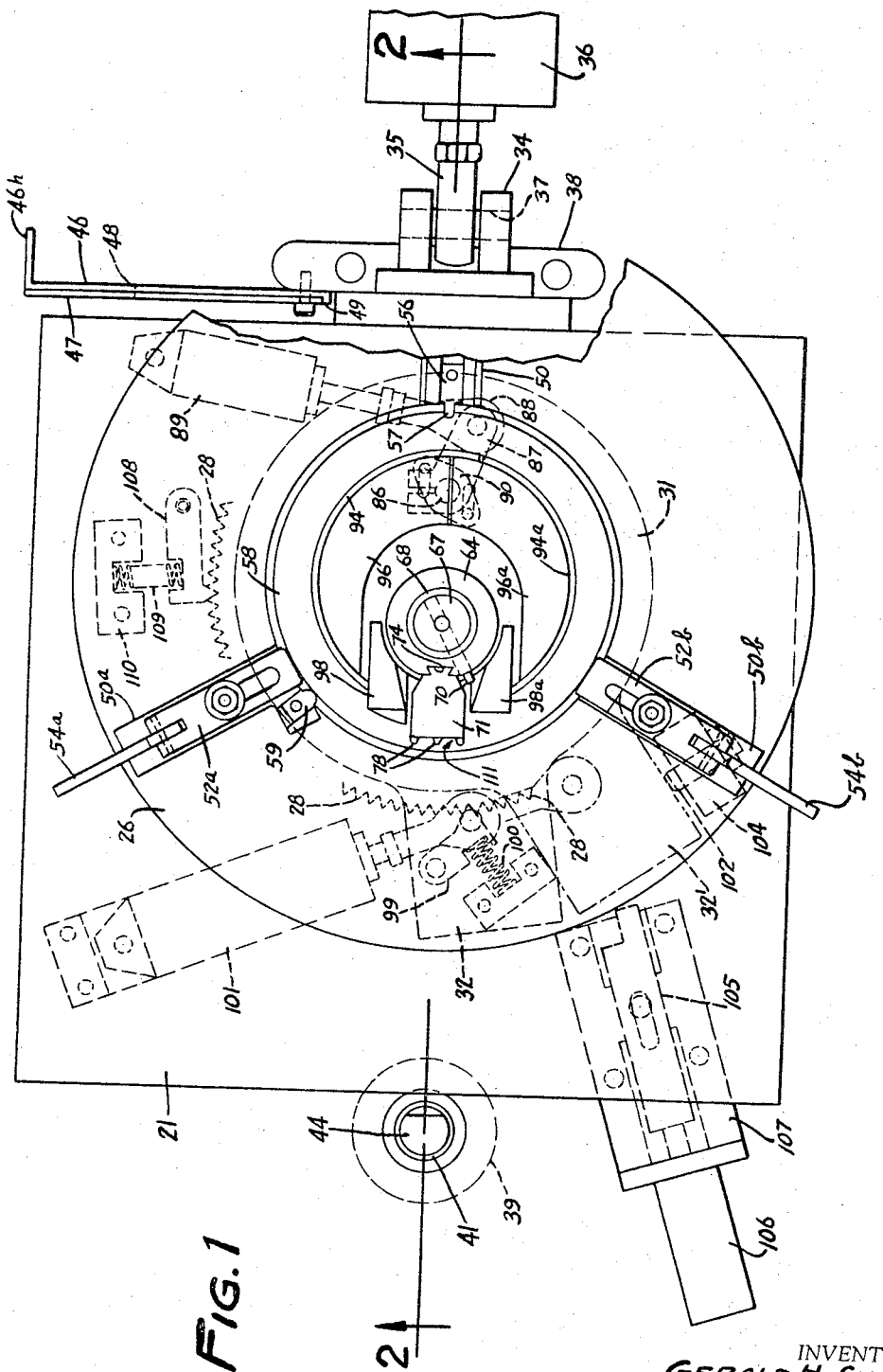
FIGURE 1 is a top plan view with a stator in stator winding position with hidden parts shown in broken lines and portions of the device broken away to illustrate otherwise hidden construction.

Turning now to FIGURE 1, there is shown structure for varying also the distance that the table assembly 20–21 can be moved in a right-hand direction as viewed in FIGURE 2. As shown in FIGURE 1, stop number 38 has secured to it a pair of gage plate members 46 and 47. These two gage members are provided with slots running longitudinally thereof as indicated by the broken lines at the point indicated 48. The table assembly 20–21 had been moved to the left as shown in FIGURE 2. It is possible to slide the member 46 and the member 47 in between plate 24 and stop 38, thus altering the effective stopping position of table assembly 20–21 when moved to the right under the influence of cylinder 36.

In at least one type of winding done on the machine, the coils are laid in three layers. Initially a series of coils are wound with plate 24 against stop 38. Then a series is wound with limiting gage plate 46 between plate 24 and stop 38. Finally both plate members 46 and 47 are used. Then 46 and 47 are withdrawn to commence winding the first layer on a new core. To advance gage plate 46 separately, a handle 46h is provided so it may be selected easily. Plate 47 is then standing alone and easily engaged to be moved into operative position. A lug 49 on the end of plate 46 engages gage plate 47 for withdrawal. When plate 46 is pulled back to inoperative position with handle 46h, plate 47 is withdrawn also. These two movements limiting gage plate members, appear at the bottom right hand corner of the table asasembly in FIGURE 2 also.

At spaced points around the top of platform 26 are secured block members 50, 50a and 50b. In FIGURE 2 only block 50 appears whereas in FIGURE 1, only a fragment block 50 is shown, but clamping block supports 50a and 50b appear in plan. An adjustable fulcrum assembly 51 is secured to the block and adjustably resists upward movement of the clamp bar 52. An eccentric clamping handle 54 pivots the outer end of the clamping lever upward to force an inner end of the clamping bar 52 downward against a portion of the stator to hold it securely on an inner ledge of block 50. Clamping bar 52 is also slotted as indicated by the broken line 55 to permit retraction with the clamping member when clamping handle eccentric handle 54 is raised to release pressure on the clamp. This permits removal of a wound stator coil and insertion of a fresh stator core. Similar slots 55a and 55b, for clamp bars 52a and 52b respectively, appear clearly in FIGURE 1.

The stator itself is provided with peripheral notches which are used to accept the bolts clamping the case of the completed stator together and these grooves, plus an additional deeper groove used to pass lead wires from one side of the stator to the other, are used in positioning a stator in a given location on a machine. A positioning member 56 is secured suitably as by the screw shown by the broken lines in FIGURE 2 to the top of clamp block 50. This positioning member enters a slot, 57, in the stator 58 and is one of two locating devices for positioning a specific stator at a given position on the machine in preparation for winding. Different stators would require different positioning devices unquestionably, but this is a reference point by means of which the stator is given a predetermined location on the structure. Reference number 56 also appears clearly in FIGURE 1 and a second positioning device 59 may be seen adjacent to clamping block 50a in FIGURE 1. As the groove engaged by positioning member 56 and the groove engaged by positioning member 59 are asymmetrically arranged, stator 58 can only be placed on the winding machine in one position. Thus every stator of any given design will be wound in the same manner.

Table assembly 20–21 has an opening in it shown at 60 in FIGURE 2 and a similar opening aligned with the opening 60 is shown at 61 in the table assembly and top and platform. Through both of these openings extend a pylon member 62 which supports shrouding that will be described in more detail later. Also extending through both of these openings is a vertically reciprocating shaft 64 which has a keyway 65 in which a key 66, secured to pillar 18, rides so as to allow the hollow shaft 64 to reciprocate, but not to oscillate. Inside a hollow shaft 64 is a second hollow shaft designated 67 which is supported by bearings, suitable bushing type, such as those shown at 68 and 69 near its top which permit it to oscillate with respect to shaft 64.

In FIGURE 13 is shown a fragment of the frame of the device which is interconnected with bed 15 and this frame fragment is designated 117. Its supports a bearing member 118 which in turn slidably receives and supports the lower end of the hollow shaft 67. Ball bearing 119 is trapped between a shoulder 64A in the large shaft 64 and a cap member 120 which is secured to the flange 121 in any suitable manner as by the cap screws 122. The bearing is held on shaft 67 against movement by a shoulder 64A and a nut 124 which is threaded onto the shaft below the bearing. Shaft 64 is secured to the outer race of bearing 119 and shaft 67 to the inner race. In this way, shaft 67 is secured to shaft 64 as to be moved with it vertically but capable of independent oscillating movement. Whenever shaft 67 is driven in a vertical pattern, therefore, shaft 64 is carried with it.

At 125 appears a fragment of an arm which connects the hollow shaft 67 to any suitable driving mechanism. This member is clamped around shaft 67 by being split and clamped with bolts shown in section at 126. The driving mechanism may be any suitable structure such as that disclosed in United States Patent 3,025,008 which provides for both vertical and lateral movement. When the end of the arm or linkage 125 is moved laterally it produces a pivoting or oscillating movement of the shaft 67 and when the linkage driving mechanism is moving vertically, both shafts will move vertically. Alternating and reversing these two actions consecutively causes the needle 70 to encircle the shroud 71.

A wire feeding needle 70 is secured to and communicates with the inside of hollow shaft 67 and extends outward through a hole in shaft 67 into a slot in shaft 64. Shaft 67 always moves with shaft 64 in its reciprocating pattern, therefore, but may also oscillate with respect to shaft 64 when required. Thus wire feeding needle may be moved in an oscillating direction then in a reciprocating direction, then in a reverse oscillating direction and finally in a reverse reciprocating direction to describe an elongated rectangle or oval shape around a shroud member 71 which is held against movement in one direction, illustratively shown as a horizontal plane, with a guide in the form of a dovetail slot 74 formed in the hollow shaft 64 engaged by a co-operatively shaped boss 71b on shroud 71. Hollow shaft 64 is driven in a vertical reciprocating path by any suitable structure and carries the hollow shaft 67 with it. A suitable structure for doing this is disclosed in United States Patent 3,025,008 whereby in a stator winder driving mechanism is shown both reciprocating and oscillating. The oscillating drive mechanism is secured to shaft 67 so that it is oscillated at the opposite ends of its reciprocating throw. Wire is fed up through the hollow center 75 of shaft 67 and out through the wire dispensing needle 70.

The principal shroud member 71 which is stabilized in one direction by being engaged with the slot in the hollow shaft 64 is stabilized in the opposite direction by engaging the stator 58. Shown herein, the blades 76 and 76a engage the top and bottom of the stator between the slots to stabilize the shroud 71 in a vertical direction. Blades 76 and 76a are used in order to avoid having the shroud apply pressure to the cuffs 77 which are usually made of a heavy weight of paper forming an insulation in the slot of the armature core. It will be noticed that the shroud 71 has the lips 78 and 78a on opposite sides of the stator and these lips actually receive and hold the wire up away from the cuffs so that the wire will not engage and cut or crush them in the mechanical winding of the wire through the slots.

At 80 is indicated a portion of a horseshoe shaped horizontal section support member which extends upward from the bottom 20 of table assembly 20–21 to which support 80 is secured by any suitable means such as the screw indicated in broken lines at 81. Horseshoe support 80 extends to a point just below the position at which the bottom of stator 58 is supported. In member 80, a vertical bore 82 has suitable bushings as at 84 and 85 pressed into it at opposite ends and pivotally receives the shaft 86. An arm 87 is clamped to the lower end of shaft 86 and this arm 87 receives an end 88 of a suitable driving means such as the air cylinder shown in the broken lines at 89 in FIGURE 1.

Figure 4:
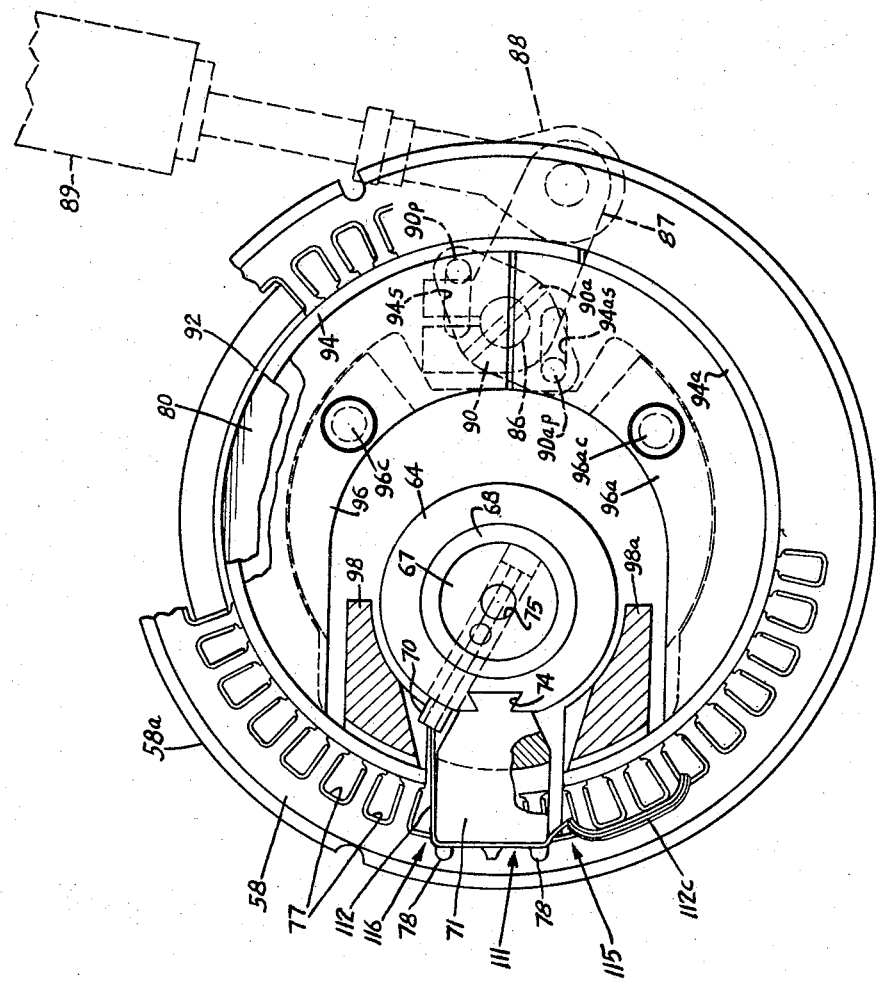
FIGURE 4 is a fragmentary plan view of a stator and the winding portion of the stator winder with hidden parts shown with broken lines and drawn to a larger scale than that used in FIGURES 1, 2, and 3.

In FIGURE 4, at the upper end of shaft 86 is a yoke means 90 which is pinned thereto suitably for rotation with the shaft. At 91 is indicated a space within which the yoke 90 may move when shaft 86 is pivoted. Numeral 92 identifies a shoulder which extends around the outside perimeter of the top of the horseshoe shaped member 80 and provides a guide for split C-ring 94 and 94a. Each half of the split C-ring has a flange on it, as at 94f in FIGURE 2 which is engaged by the yoke 90. Pins 90p and 90ap are fixed in the yoke 90 and slide in slots 94s and 94as in the flanges 94f and 94af which are part of halves 94 and 94a of the split C-ring. When the yoke is turned in one direction, the ends of the split C-ring adjacent to yoke are moved apart and when it is pivoted in the other direction they are drawn together.

A pair of block members, one of which is shown at 96 in FIGURE 2, is secured to the horseshoe shaped member 80 and serves as the inner guide for the split C-ring members 94 and 94a. In FIGURE 1, in addition to the structure already described as being shown in that figure, there can be seen the hollow shaft 64, the top of the bearings 68 and the top of hollow shaft 67 having the needle 70. Adjacent to the hollow shaft may be seen the main shrouding 71 with the wire supporting lips 78 sticking out at the left when that figure is viewed in the same manner as FIGURE 2. Clearly shown in this figure is the groove 74 in the shaft 64 for receiving the dovetail boss of the shroud 71. At both sides of the shroud 71 can be seen the supplemental shrouding members 98 and 98a which are secured to and are supported by the pylon member 62 shown in FIGURE 2. To the right of the hollow shaft may be seen the members 96 and 96a which serve as the interior guides for the split C-ring members 94 and 94a. In broken lines may be seen the yoke 90 supported by the shaft 86 which is turned periodically as required by the arm 87 and air cylinder 89. This structure is shown in greater detail and FIGURES 4 and 5 will be described in more detail in connection with those figures.

Broken lines also illustrate ring 31 and its projecting tang 32. To tang 32 is secured a dog member 99 which is urged by a spring 100 toward the broken line representation shown at 28 of the notched ring that it is secured to the platform 26. A suitable means such as air cylinder 101 when extended moves the tang to the broken line position designated 32' which causes it to engage a stop-pin 102 supported in any suitable block 104. Stop-pin 102 may be adjustable in order to provide precise stopping point for a tang 32. As the tang is moved from the position shown in 32 to the position 32', the dog 99 which also appears in FIGURE 2, being engaged in a notch of the notch wheel 28, causes that wheel to move the same distance as the tang of 32. This indexes the platform 26 the desired amount, here 3 slots of the alternator stator being wound.

After coils have been wound in a complete cycle around the alternator stator with indexing after each coil from 32 to 32', a secondary stop means 105 advanced by a suitable means here shown as a hand lever 106. Stop 105 is slidably supported in any suitable support such as a block member 107. When this auxiliary stop 105 is advanced, it intercepts the path of tang 32 at a certain fraction of the distance of its movement when moved against stop 102. In so doing, it indexes the stator a predetermined fraction of a coil index, here only one notch, to provide an offset before a second series of coils is wound with an index from 32 to 32' after each coil. Upon completion of the second row of coils, again the index auxiliary index stop 105 is advanced for a one slot index, and the third row of coils may then be wound thus filling the slots in the stator. At the same time that each auxiliary index is completed, one of the gage bars 46 and 47 is advanced or withdrawn. At the first one slot index, bar 46 is advanced into operative position. When the second one slot index, bar 47 is moved into place between stop 38 and plate 24. Both gage bars are removed when the one stop index is made at the end of a winding operation to correctly orient platform 26 for the beginning of a new stator.

Figure 3:
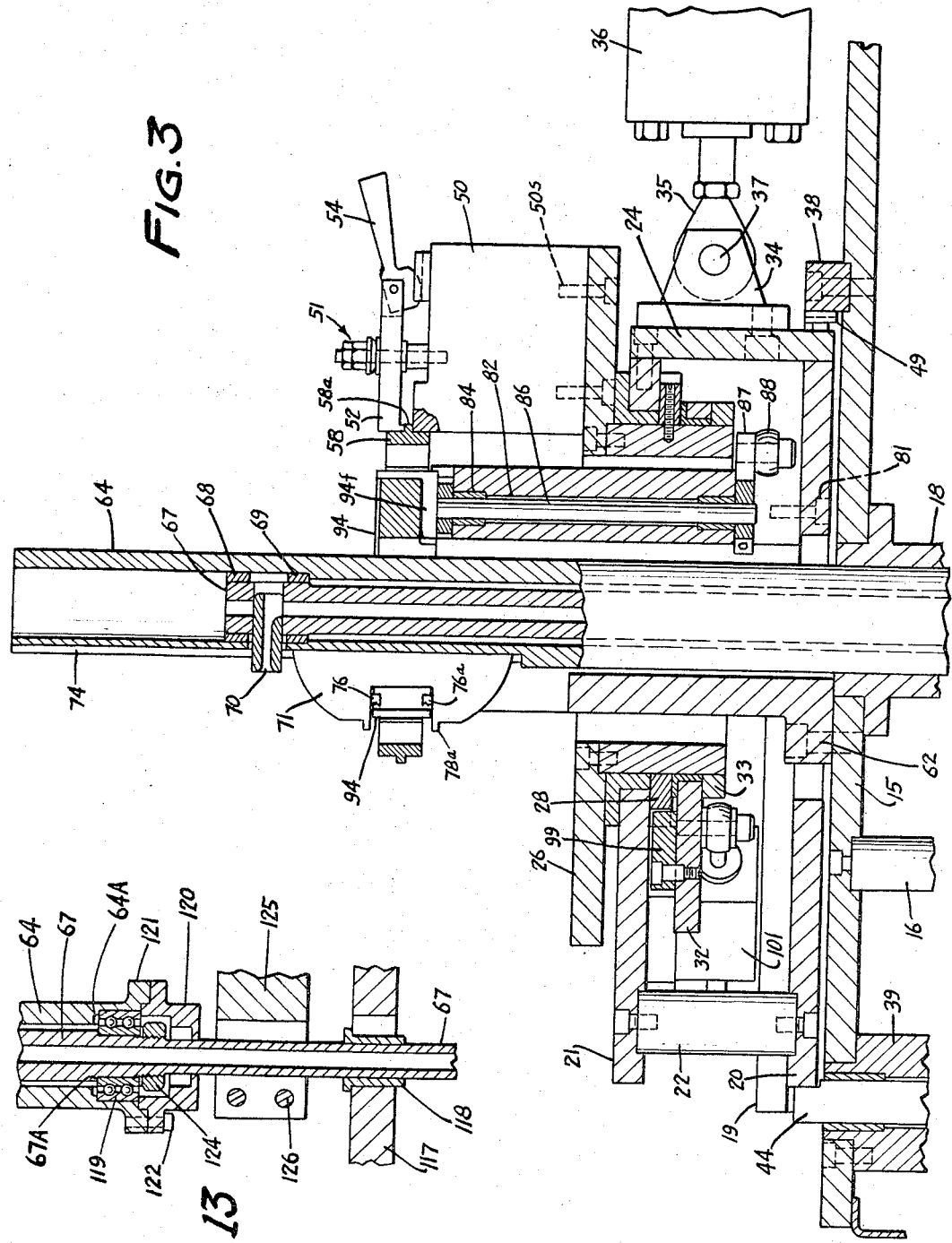
FIGURE 3 is a view similar to FIGURE 2 with the parts in an adjusted position relative to each other.

When tang 32 is returned to the position shown in broken lines designated 32 as distinguished from the position 32', a dog member 108, which is pivotally supported by the table top 21 and is spring-urged as shown at 109 from a spring base block 110, prevents the rings 28 from turning in a reverse direction and holds its indexed position during the return stroke of cylinder 101 and tang 32. Structures shown in FIGURE 3 are substantially identical with those shown in FIGURE 2 except that the table assembly 20–21 is shown moved to the left so as to engage stop 44. This is the position in which platform 26 is moved prior to indexing. Also shaft 64 is shown in its elevated position as opposed to its lowered position as shown in FIGURE 2. In FIGURE 3 also an exterior flange member of the stator 58a is shown securely clamped between the block 50 and clamp arm 52. Similar clamping occurs at all of the three clamping stations 50, 50a and 50b. Also in this figure, the end of the split C-ring 94 may be seen when an upper blade 76 of the shroud member 71 has been broken away to show how the C-ring engages the shroud 71 to hold it in a fixed vertical position during the indexing process and the shroud is disengaged from the stator. To so position the C-ring members 94 and 94a, the arm 87 has been withdrawn by the cylinder 89, of which the end 88 is shown, so that the shaft 86 has been pivoted to separate the rear or right-hand ends of the split C-ring and advance the forward ends to engage the stator and block the openings of the stator slots through which winding has just been completed.

In FIGURE 4, which is an enlarged plan view of the stator and the winding structure with portions broken away so that otherwise hidden parts may be seen, the cylinder 89 is represented in broken lines together with its connecting piston rod clevis 88 shown connected to the arm 87 which in turn is secured to the shaft 86. Still shown in broken lines is the yoke member 90 which is secured to shaft 86 so as to rotate with it by any suitable means such as the pin represented by the broken lines 90a. Each of the pins 90p and 90ap engages a slot in one of the members 94 and 94a. The slot of 94 is shown in broken lines identified as 94s while the slot for 94a is identified 94as. Cylinder 89 is illustrated in an extended position, and the C-ring members 94 and 94a are drawn together to leave a space for the wires to enter the slots as winding proceeds. Their alternate position will be described in connection with FIGURE 5. On the left-hand side of the drawing, if viewed vertically or at the top side of the drawing if viewed with the sheet turned 90° in a clock-wise direction, the stator 58 is broken away so that the horseshoe shaped support may be seen. Also clearly shown is the rim 92 which serves as the outer guide for the split C-ring members 94 and 94a. The inside guides which hold the members 94 and 94a against the rim 92 and between them provides the ways within which the split C-ring slides are shown at 96 and 96a. The cap screws 96c and 96ca respectively secure the two members 96 and 96a to the horseshoe shaped support 80. Wire winding needle 70 is clearly seen extending from the hollow center shaft 67 and connected by internal passageway with a hollow center 75 shaft 67. Bearing 68 is seen spacing the hollow shaft 67 from a larger outside shaft 64. Hollow shaft 64 may be seen to have the dovetail groove 74 into which the matching dovetailed boss on shroud 71 extends. Wire being wound 112 extends from needle 70 and engages the lips 78 of shroud 71 which holds the wire up away from the cuffs 77 that are in the slots of the stator. Space 111 between lips 78 allow for previously wound coils.

The coil 112c is represented as wound in a clockwise direction viewed from the outside of the stator or counter-clockwise viewed from the interior of the stator. Needle 70 has carried the wire 112 upward through slot 115. In most, if not all instances, it is necessary for the wire to always pass the same direction through a given slot in order to avoid having one series of windings cancel the effect of the adjacent windings when carrying current. Winding of the next coil, the first wire of which is shown extending across the lips of shroud 71, requires the needle 70 be moved in such direction as to cause again the wire 112 be carried through the slot 115 in a direction from bottom to top. Accordingly, the movement of shaft 64 and 67 is reversed so that needle 70 carries the wire in a reverse direction around the shroud 71 to always have wire 112 passing from bottom to the top through slot 115. On the winding of the third coil, the direction of rotation or motion of the needle is again reversed so that wire 112 is carried through slot 116 in the same direction as before, in this instance, from top to bottom.

Figure 5:
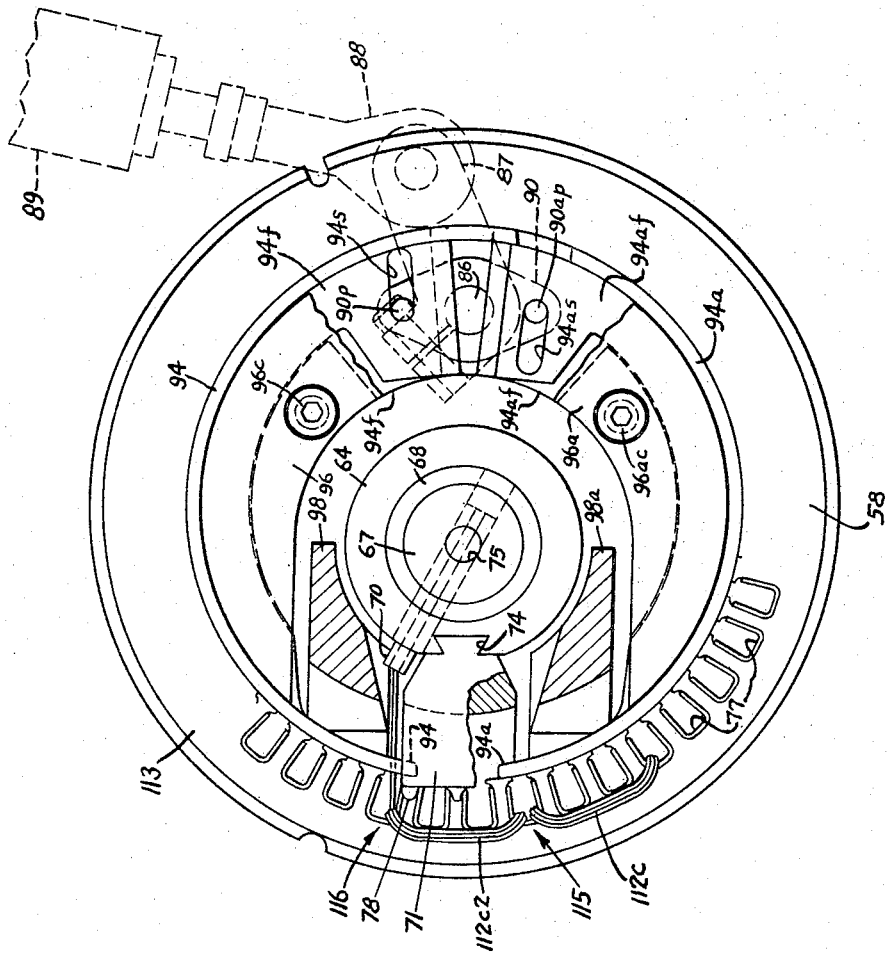
FIGURE 5 is a similar view to FIGURE 4 with the parts shown in adjusted position relative to each other.

Turning now to FIGURE 5, the cylinder 89, still shown in broken lines, has moved the yoke 90 to a position that spreads the split C-ring members 94 and 94a apart at their ends nearer to the cylinder. This movement of the split C-ring serves a twofold purpose. In the first place, the end of C-ring half 94a, visible because the shroud 71 is broken away, and also the broken line representation of the end of C-ring 94 may be seen extending between the upper and lower portion of the shroud and engaging it both top and bottom. With the advancement of the split C-ring halves 94 and 94a to engage the shroud 71, it will be stabilized in a vertical direction by the split C-ring while shaft 64 stabilizes it against movement in a horizontal plane. When shroud 71 is thus supported, the table 20–21 may be moved so as to disengage the stator 58 from the shroud as necessary to permit indexing. The split C-ring is not only supporting the shroud in this vertical position when disengaged from a stator core 58, but it also covers the openings to the slots in the stator previously wound with coil 112c2 thus assuring that no windings will slip out of stator slots accidentally during the indexing step.

Figure 6:
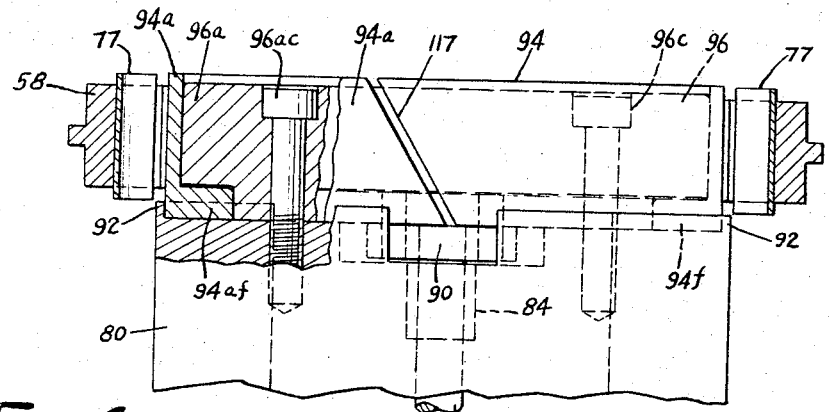
FIGURE 6 is a fragmentary rear elevation of the C-ring structure with a stator shown in vertical section and portions of the structure broken away to illustrate construction more clearly; it is drawn to the same scale as FIGURES 4 and 5; broken lines illustrate hidden parts.

In FIGURE 6, which is an enlarged fragmentary view of the C-ring and their support from the back, the horseshoe shaped support 80 is shown clearly and it is broken away at the left side of the view so that the rim 92 appears clearly engaging the C-ring portion 94a at the outside bottom. 94a is seen also to have a flange at the bottom and this flange is identified 94af. The guide member numbered 96a is seen engaging 94a at the right side at top so that between 96a and 92 a way or track for guiding the C-ring portion 94a of the split C-ring 94 and 94a is formed. Similar structure is formed for the member 94 and it is shown in broken lines at the right-hand side. 80 is broken away at the bottom and a fragment of a broken off shaft 86 is seen clearly. Broken lines also illustrate bearing 84 and in broken lines the yoke 90 is also shown. Number 117 identifies the diagonal rear division between the portions 94 and 94a of the split C-ring. It will be seen, therefore, that even when the C-ring is moved to support the shroud 71, there will still be a portion of each of these rings overlapping each other at their opposite ends so that the slots in the stator core continue to be blocked across the back of the ring even when they are advanced under the shroud.

Figure 7:
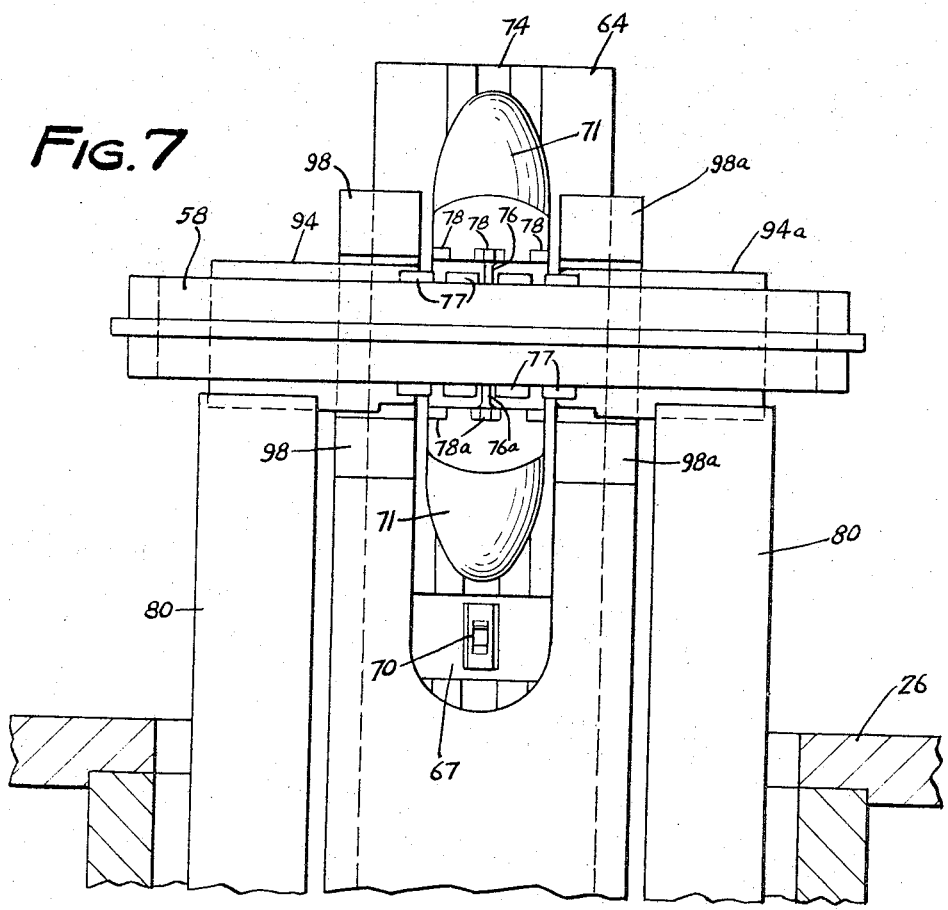
FIGURE 7 is a fragmentary, front elevation showing the hollow reciprocating shaft tooling with a stator shown in position on a machine; broken lines illustrate hidden parts and portions of the machine have been deleted for the sake of simplicity and clarity.

FIGURE 7 is a front elevation view. Blades 76 and 76a may be clearly seen engaging the stator 58 between two of the cuffs 77 to hold shroud 71 away from the cuffs so that they will not be damaged. The wire supporting lips or ledges 78 and 78a are also clearly visible. Also through the slot in the outer or reciprocating shaft 64 may be seen the inner shaft 67 and the wire feeding needle or gun 70 protruding through the slot. A portion of the platform 26 also appears at the lower portion of the drawing.

Figure 8:
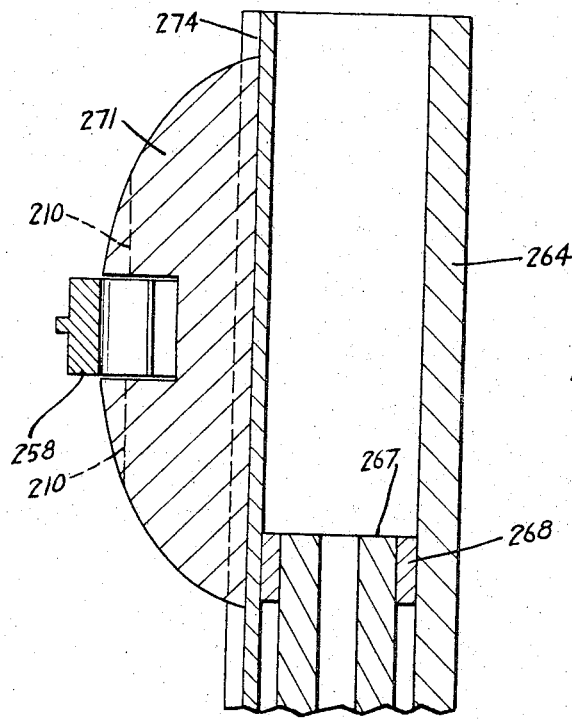
FIGURE 8 is a fragmentary vertical section of a modified form of shroud structure drawn to the scale of FIGURES 4 and 5; broken lines show hidden parts.

FIGURE 8 illustrates a form of shroud used with a stator that is insulated without the use of cuffs. In this instance, the shroud may bear directly on the upper and lower surfaces of the stator as it is held in the machine. This is illustrated in FIGURE 8 with the shroud 271 bearing directly on the stator 258 to stabilize the shroud 271 in a vertical direction that is against moving in a vertical direction while the main support post or pillar 264 supports the shroud in the dovetail slot 274 against movement in a horizontal plane.

Figure 9:
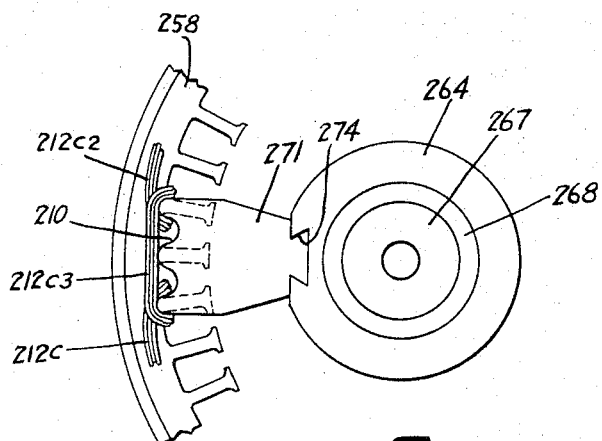
FIGURE 9 is a top plan view of the device shown in FIGURE 8 and drawn to the same scale.

Shown by the broken lines in that figure, the shroud 271 is equipped with grooves 210, seen in full lines in FIGURE 9, for the purpose of accommodating coils wound previously to the one being wound at any given setting of the shroud with respect to the stator core 258. As seen in that FIGURE 9, the coil 212c2 and 212c each have a one side of their total windings embraced by the openings 210 so that the coils are not cut or injured by the shroud when coil 212c3 is being wound. Other than the differences shown in these two views, the structure of this machine may be identical to that illustrated in FIGURES 1–7.

Figure 10:
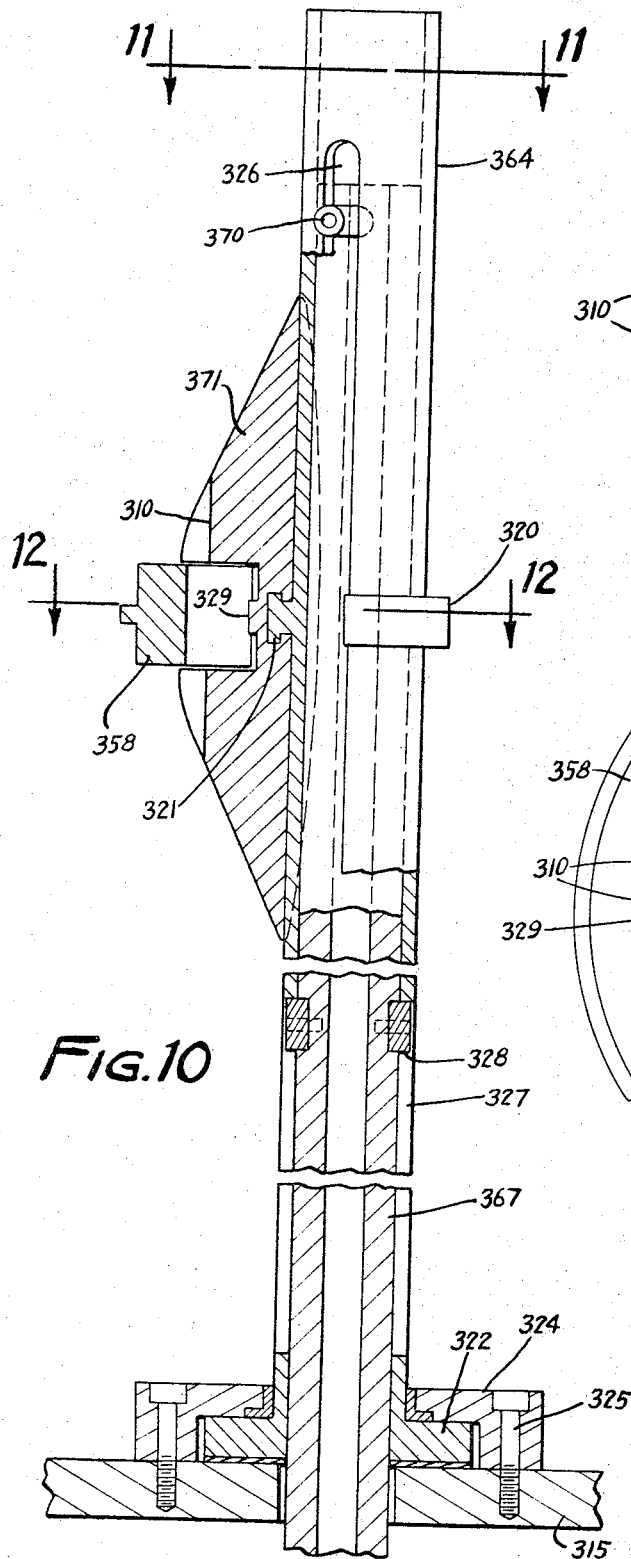
FIGURE 10 is a diagrammatic representation of a modified form of the invention drawn to a scale between that of FIGURES 1–3 and FIGURES 4–7; broken lines illustrate hidden parts and portions of the device are omitted to conserve space.

In FIGURE 10 is shown a form of device that differs in several particulars from the principal form of the device. Structure for supporting the stator and for indexing the machine will remain the same as shown in the form of the device in FIGURES 1 through 7. The principal difference in the present case is that the method of stabilizing the shroud 371 with respect to the stator 258 is a reverse in two respects of that shown in the forms of the invention in the invention in FIGURES 1 through 9.

In the first place, rather than having a channel cut in the larger or outer hollow shaft 364, there is formed on that shaft an extending key 320 which engages a complementary slot 321 on the shroud 371 so as to stabilize the shroud against vertical movement. That is to say, the shroud 371 is held against any vertical movement, not by its engagement with the stator 358 as would be true if it were like the structure shown in FIGURES 1 through 9, but rather by engagement of slot 321 with keyway 320. In this instance, therefore, the outer shaft 364 does not reciprocate vertically, but instead remains at a given elevation vertically. It may be seen in the lower part of FIGURE 10 that the shaft 364 have a collar 322 formed thereon which in turn is embraced by a hold down means 324 suitably secured as by the screws 325 to stationary portion or machine bed 315. Collar 322 is free to pivot within the hold down means 324; vertical movement is precluded. The inner hollow shaft 367, however, is free to reciprocate inside the shaft 364 and the slot 326 is provided for this purpose so that the wire feeding needle 370 may extend through the slot and allow wire to be wrapped around the shroud 371. The slot extends vertically far enough to allow needle 370 to reach from above the shroud 371 to a point below it. Although the needle 370 protrudes through the slot 326, it is advisable to have some other means for preventing relative rotation between the inner shaft 367 and the outer shaft 364. Any suitable means may be used and is here illustrated as being slots 327 in shaft 364 with the keys 328 secured to the inner shaft 367 and engaging the slots to prevent any relative rotational movement between shafts 367 and 364. At the same time the keys 328 sliding up and down the slot 326 allow the inner shaft 367 to reciprocate vertically as needed. The periodic oscillatory movement necessary to carry the needle side-to-side of the shroud alternately as it reciprocates vertically may be applied by any suitable structure such as that referred to with respect to the forms of the structure shown in FIGURES 1 through 9 or in the alternative pivoting movement could conceivably except that all of the driving functions may be applied to the shaft 367 and none to the outer shaft 364.

While the key 320 engaging the slot 321 stabilizes shroud 371 against any vertical movement, some means is necessary to prevent movement from side-to-side as the shaft 364 oscillates. A suitable means for doing this is shown as the boss 329 which projects into a stator opening as shown clearly in FIGURE 12. Thus the shroud 371 is stabilized against vertical movement by its engagement with the shaft 364 and is stabilized against horizontal movement by engagement of the stator. This is precisely the reverse of a manner in which the shrouds 71 and 271 are stabilized.

Figure 11:
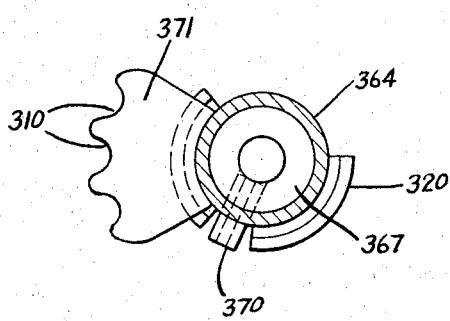
FIGURE 11 is a fragmentary horizontal section of the structure shown in FIGURE 10 taken at line 11—11 of FIGURE 10 with broken lines illustrating hidden parts.

The front of shroud 371 is notched as at 310, illustrated in broken lines in FIGURE 10 and in the vertical view or top plan view in FIGURE 11 in solid lines in order to avoid injuring coils previously wound exactly as is true of the structure shown in FIGURES 8 and 9. In this particular instance, a winding of somewhat greater pitch is wound and hence the need for three grooves rather than two. In every instance the number of grooves may vary depending upon the type of winding given to the stator core.

Figure 12:
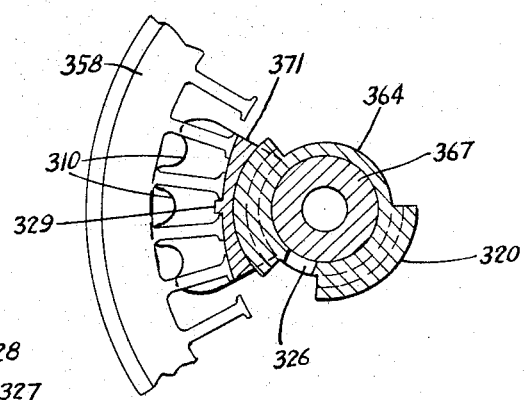
FIGURE 12 is a fragmentary horizontal section taken on the line 12—12 of FIGURE 10.

The structure shown in FIGURES 10–12 is particularly useful where a pitch of such wide angle is being wound that to put a horizontal groove in the outside shaft in order to allow the needle to swing through it would necessitate substantially severing the outer shaft. In the technique employed here obviously no such cut is necessary in the outer shaft. The slot 326 is substantially a vertical cut only. FIGURES 10–12 are somewhat diagrammatic merely for the purpose of illustrating novel structure without repeating structures that are clearly obvious to anyone designing machines such as bearings and the like.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A coil winding machine for winding coils in internally multiple slotted stators comprising a frame, stator support means secured to said frame for supporting a stator on said frame, said stator support means having an open center, a hollow shaft movably secured to said frame and extending through the open center of stator support means, first guide means formed on said hollow shaft, a shroud designed to embrace said stator, second guide means formed on said shroud, said first and second guide means including a projection and an elongated coacting groove for slidably accommodating the projection to slidably connect the shroud with the hollow shaft and to limit movement of said shroud to the direction of extension of said groove, an opening in said hollow shaft extending in a direction at right angles to said first guide, a second hollow shaft movably received within said first hollow shaft to move in the direction of extension of the opening in said hollow shaft, a wire feeding needle secured to said second hollow shaft communicating with the interior thereof, and extending through the opening in said hollow shaft: means mounting said hollow shafts for alternate reciprocating and oscillating movement to carry said wire feeding needle in a path around said shroud to wind coils on the stator, means secured to said frame for producing relative movement between said stator supported on said stator support means and said shroud to alternately disengage and engage said stator and said shroud, said shroud engageable with said stator during winding to stabilize the shroud in the direction of extension of said groove.

2. The structure of claim 1 in which there is means movably secured to said frame for engaging and holding said shroud in place of its engagement with said stator during indexing.

3. The structure of claim 2 in which said means for holding said shroud in place of its engagement with said stator during indexing comprises, a split C-ring; said split C-ring serving also to cover substantially all the wire entry slots of a stator during indexing; said split C-ring having overlapping rear portions.

4. The structure of claim 1 in which there are flanking shroud members secured to said frame, spaced from said shroud on either side thereof a distance equal to the width of a wire receiving slot of a stator; said flanking shroud members being relieved to provide space for wound coils, said shroud also having portions removed to provide space to receive previously wound coils.

5. The structure of claim 1 in which said shroud has members thereon for engaging a stator between the wire receiving slots thereof to hold the balance of said shroud spaced from said stator core member, and lips on said shroud to support the ends of a coil being wound.

6. The structure of claim 1 in which said means for producing relative movement between said shroud and a stator secured to said frame includes a variable stop means for variously limiting the movement of a supported stator and said shroud toward each other; whereby consecutive series of coils are wound on a stator core at different depths in the slots thereof.

7. The structure of claim 6 in which said variable stop means consists of a stop block against which one of the relatively movable shroud and stator support abutts to limit relative movement of them toward each other, at least one blade movably secured to stop block for insertion between and removal from between said stop block and the member that engages it, and means secured to said stator support means for indexing the stator the width of a coil.

8. The structure of claim 7 in which there are at least two of said blades independently movable between said stop block and the member that engages it and simultaneously removable therefrom.

9. The structure of claim 1 in which said first guide extends longitudinally on said hollow shaft, said hollow shaft reciprocates and said second hollow shaft oscillates, and said opening in said hollow shaft is longer than said shroud is wide.

10. The structure of claim 1 in which said first guide extends circumferentially on said hollow shaft, said hollow shaft oscillates, said second hollow shaft reciprocates and said opening in said hollow shaft is longer than said shroud.

11. The structure of claim 1 in which said first guide is a key-way and said second guide is a boss thereon of complementary form.

12. The structure of claim 1 in which said first guide is a projecting member and said second guide is a complementary formed key-way.

13. The structure of claim 1 in which said shroud has a portion engageable with surfaces of said stator to hold said shroud stationary against reciprocating motion relative to said stator, said shroud being secured against oscillating motion by the guide on said hollow shaft; the portion of said shroud engaging the stator being no wider than the distance between wire receiving slots of the stator to be wound.

14. The structure of claim 1 in which said shroud has a portion engageable with surfaces of the stator to hold the shroud against oscillating motion and reciprocating motion is prevented by said guide means.

15. The structure of claim 1 in which said shroud has means engageable with the stator being wound to hold it against reciprocating motion and said shroud has grooves formed in its surface facing the outside of the stator to receive previously wound coils while winding subsequent coils.

16. A stator winding machine comprising, a frame, a pair of concentric shafts secured to and supported by said frame, means secured to said frame and at least one of said shafts for reciprocating it, means secured to said frame and at least the other of said shafts for oscillating it; said means secured to said frame and said shafts reciprocating and oscillating them substantially alternately, the center of said concentric shafts being hollow, a wire feeding needle nozzle communicating therewith and extending beyond the outer surface of the outer of said shafts; the outer of said shafts having an opening cut therein to receive said wire feeding needle, guiding means formed on said outer shaft and extending in a direction at right angles to the opening of said outer shaft receiving said wire feeding needle, a shroud adjacent said shaft, complementary structure thereon engaging said guiding means formed on said outer shaft whereby said outer shaft stabilizes said shroud against motion in the direction of extension of said wire feeding needle receiving opening, a core support means to support a core, means to move the core support means and its associated core in stationary engagement with said shroud and in movable relation thereto selectively for permitting sequential winding of coils onto said core using said shroud as a wire guide and indexing said stator with respect to said shroud respectively, means secured to said core support means for indexing it selectively; and means on said shroud for engaging a stator on said frame to hold said shroud against movement in a direction at right angles to that inhibited by said guide.

17. A method of winding slotted electrical cores utilizing a shroud that embraces the core ends and a wire feeding means having a wire feeding needle, said method including the steps of supporting the core for selective movement to a first position wherein the core engages a portion of the shroud and to a second position wherein the core is spaced from said shroud, holding the shroud in a fixed temporary position when the core is spaced from the shroud, advancing the core to the first position to engage a portion of the core with the shroud held in the fixed temporary position, releasing the shroud from the fixed temporary position after the shroud is engaged by the core, holding the shroud against angular movement and allowing the shroud to have linear movement with respect to the wire feeding means, temporarily holding the shroud against linear movement through the engagement of the core with the shroud, moving the wire feeding means with respect to the shroud in alternate reciprocating and oscillating motions to describe a substantial oval around said shroud whereby wire fed from the needle encircles the shroud repetitively and slides from the shroud into the slots of the slotted core, after a coil is wound temporarily holding the shroud against linear movement, withdrawing the slotted core from the shroud to the second position, indexing the slotted core, and repeating the steps until a plurality of coils have been wound on said slotted electrical core.

References Cited

UNITED STATES PATENTS

| | | | |
|---|---|---|---|
| 2,445,937 | 7/1948 | Carpenter | 242—1.1 |
| 2,969,928 | 1/1961 | Larsh | 242—1.1 |
| 2,988,291 | 6/1961 | Greene et al. | 242—1.1 |
| 3,025,008 | 3/1962 | Nill et al. | 242—1.1 |
| 3,102,696 | 9/1963 | Larsh | 242—1.1 |
| 3,210,020 | 10/1965 | Greene et al. | 242—1.1 |

FOREIGN PATENTS 1,053,089  3/1959  Germany.

STANLEY N. GILREATH, *Primary Examiner.*

BILLY S. TAYLOR, *Examiner.*